Dec. 3, 1929.  J. ROBINSON  1,737,687

AUTOMATIC TRAIN PIPE COUPLING

Original Filed Nov. 26, 1921

INVENTOR
Joseph Robinson,
BY Watson, Coit,
Morse & Grindle,
ATTORNEYS.

Patented Dec. 3, 1929

1,737,687

UNITED STATES PATENT OFFICE

JOSEPH ROBINSON, OF NEW YORK, N. Y.

AUTOMATIC TRAIN-PIPE COUPLING

Application filed November 26, 1921, Serial No. 517,844. Renewed January 3, 1927.

My invention relates to automatic train pipe couplings and has for its object to provide an improved means for connecting the train pipe hose to the coupling head, and for permitting removal of the gaskets between mated coupling heads without parting the cars. With these objects in view the invention resides in combinations, arrangements, and improvements hereinafter described, pointed out in the appended claims, and illustrated in the accompanying drawings in which Figure 1 is a side elevation of a conventional form of coupling head provided with my improvement.

Figure 1:
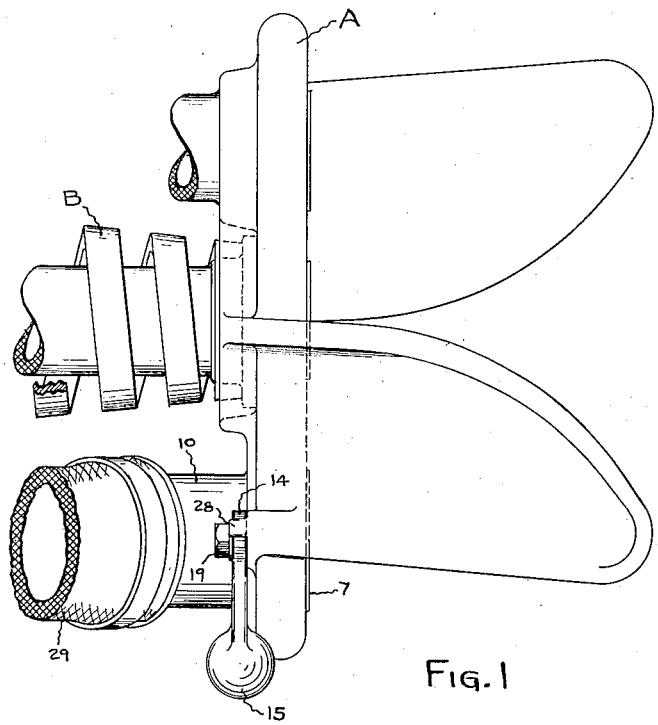
Figure 2:
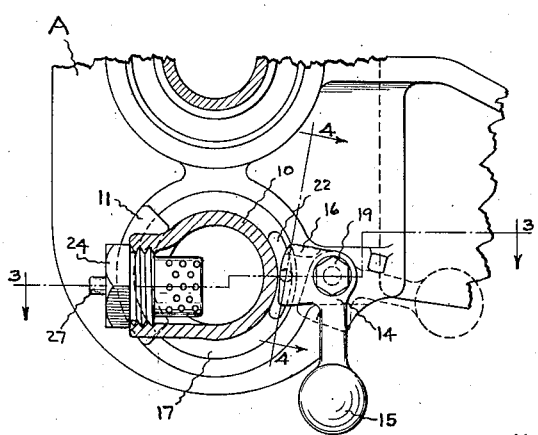
Figure 2 is a fragmentary view of a coupling head provided with my improvement.
Figure 4:
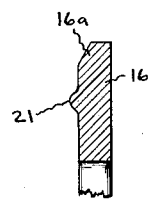

Figure 4 is an enlarged detail of the latch 14 taken on the line 4—4 of Figure 2.

Referring now to the drawings: My improvement may be used on any suitable form of coupling head A which may be supported from the car coupler in any desired manner. I have indicated at B a portion of a conventional form of support such as illustrated in my Patent No. 1,245,778 granted November 6th, 1917. My improvement may of course be applied to one or more ports of the head. I show it applied to the lower or steam port of a coupling head having three vertically aligned ports, but it may, of course, be applied to the air or upper ports if desired.

The improvement consists in providing the coupling head with an opening 5 extending therethrough and provided with an inwardly extending wall or flange 6 against which a suitable gasket 7 rests. The gasket is preferably provided with an interior annular groove 8 to admit the fluid carried, whereby the gasket is expanded into tight engagement with its seat in the head A, against an opposing gasket, and against the front face 9 of the fitting or conduit 10.

On the rear side of the head and adjacent to the opening 5 and preferably on the left side thereof, I provide a dog or grooved lug 11. The opening 5 in the head is slightly larger than the outside diameter of the forward end 12 of the fitting 10, so as to permit one edge of the fitting to be hooked under the dog or set in between the inner face of it and the rear face of the gasket 7 whereupon the fitting is tilted towards the head A and into the position shown in Figure 3. During this operation the latch or swinging clamp 14 is, of course, in the unlocked position indicated by the dotted lines in Figure 2, but when the fitting to conduit 10 has been moved to the position in Figure 3 the latch is swung downwardly to the position shown in Figure 2, the weighted handle 15 serving to maintain the latch in this position against accidental disconnection from the fitting 10. The latch is located on that side of the fitting opposite the side on which the dog 11 is located, and is provided with an inwardly extending projection or nose 16 adapted to be rocked into and out of engagement with the flange 17 of the fitting by raising or lowering the handle 15 of the latch. A suitable stud or other form of pivot device 19 secures the latch to the head A.

Figure 3:
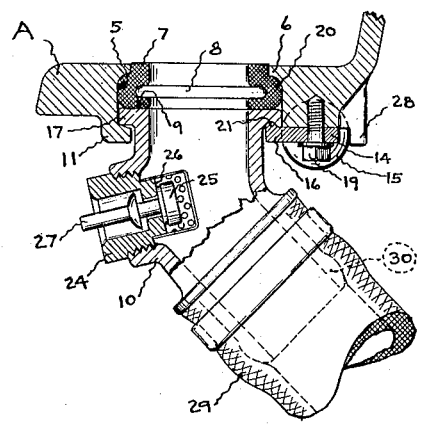
Figure 3 is a horizontal section on approximately the line 3—3 of Figure 2.

When the fitting 10 is inserted into the position shown in Figure 3 the flange 20 of the gasket 7 is under slight initial compression obtained by moving the latch 14 to the service position, during which operation the tapered or bevelled surface 16$^a$ of the nose 16 rides up over the flange 17 and forces it into the head A against the gasket 7. When the fluid carried is admitted to the fitting 10 it expands the flange 20 of the gasket, thus driving the latter into tight engagement with its seat in the head, and with the forward face 9 of the conduit 10. This arrangement produces an absolutely fluid tight joint and forces the flange 17 of the conduit rearwardly against the latch 14 with sufficient force to firmly hold the latch against accidental disconnection from the conduit 10 while the fluid pressure is on. To meet those conditions under which it is desirable to positively lock the latch 14 against accidental disconnection from the conduit 10, I provide the projection 16 of the latch with a small round pointed bead or tit 21, formed integral with or separately of the latch, which seats within a complementary recess or segmental groove

22 formed on the rear side of the flange 17. When the fluid pressure is on, these parts are rigidly interlocked against disconnection and it is therefore necessary to relieve the conduit 10 of the fluid pressure before the latch can be easily rocked out of connection with the flange 17. In most cases the leak at the gasket 7, which it is desired to remove, is of such extent as to quickly relieve this pressure upon closing the valves controlling the fluid supply to the coupling head A. But in some instances, especially when dealing with the air ports in the head A, the leak is not sufficient to quickly relieve the pressure. To meet this condition I provide the conduit 10 with any suitable form of release or drain valve 24, preferably of the well known Gold gravity operated type. With this arrangement, the disc 25 of the valve moves into fluid tight engagement with the seat 26 of the valve upon admission of the fluid to the conduit 10. To draw off the pressure in the conduit, the valve stem 27 is pushed downwardly or inwardly, with any suitable tool, thus unseating the valve disc 25 and permitting escape of the fluid, thereby releasing the interlock of the latch 14 with the flange 17 of the conduit 10. By then moving the latch to the position shown by the dotted lines in Figure 2, thereby bringing the handle 15 into engagement with a rearwardly projecting stop 28 formed on the head A to limit the extent of upward movement of the handle 18, the conduit 10 may be readily tilted or rocked out of engagement with the dog or lug 11 and removed from the head. Thereupon the gasket 7 may be extracted, and the parts reassembled by reversing this operation. It is understood of course that any suitable form of train pipe hose 29 may be connected in any desired manner to the shank 30 of the fitting 10, and that such fitting may extend entirely through the head and carry the gasket 7, if desired.

What I claim is:

1. An automatic train pipe connector comprising in combination, a coupling head having an opening, a flange on said head surrounding said opening and extending inwardly toward the axis thereof, a conduit removably mounted in said opening with its front end spaced rearwardly of said flange, an expansible gasket in said head between said flange and the front end of said conduit, said gasket having a flexible front flange adapted to bear against said flange on the head and having a flexible rear flange adapted to bear against the front end of said conduit, said gasket also having an interior annular recess between its flanges whereby pressure fluid in said recess of the gasket serves to force the flanges thereof axially against said flange on the head and the front face of said conduit.

2. An automatic train pipe connector comprising in combination, a coupling head having an opening, a flange on said head surrounding said opening and extending inwardly toward the axis thereof, a conduit mounted in said opening with its front end spaced rearwardly of said flange, means for holding said conduit in said opening, an expansible gasket in said head between said flange and the front end of said conduit, said gasket having a flexible front flange adapted to bear against said flange on the head and having a flexible rear flange adapted to bear against said front end of said conduit, said gasket also having an interior annular recess between its flanges whereby pressure fluid in said recess of the gasket serves to force the flanges thereof axially against said flange on the head and the front face of said conduit, whereby the conduit is forced rearwardly against said holding means to prevent disengagement of the same from the conduit.

3. An automatic train pipe connector comprising in combination, a coupling head having an opening, a flange on said head surrounding said opening and extending inwardly toward the axis thereof, a conduit removably mounted in said opening with its front end spaced rearwardly of said flange, a latch for holding said conduit in said opening, an expansible gasket in said head between said flange and the front end of said conduit, said gasket having a flexible front flange adapted to bear against said flange on the head and having a flexible rear flange adapted to bear against the front end of said conduit, said gasket also having an interior annular recess between its flanges whereby pressure fluid in said recess of the gasket serves to force the flanges thereof axially against said flange on the head and against the front face of said conduit to thereby force said conduit into locking engagement with said latch.

4. An automatic train pipe connector comprising in combination, a coupling head having an opening, a flange on said head surroundinig said opening and extending inwardly toward the axis thereof, an expansible gasket in said head having a front flange adapted to bear against said flange on the head and also having a rear flange, said gasket also having an open recess between said flanges whereby pressure may enter said recess and force said front flange forwardly and said rear flange rearwardly, a conduit mounted in said head and against which said rear flange of the gasket is adapted to press, said conduit being removable rearwardly from the head whereby said gasket may also be removed rearwardly from the opening in said head.

5. In an automatic train pipe connector, in combination, a coupling head having an opening therethrough, a conduit mounted in said opening and removable rearwardly therefrom, means for locking said conduit in said opening, the front end of said conduit terminating rearwardly of the front end of said opening whereby a seat is formed for the reception of a gasket, an expansible gasket arranged in said seat in front of said conduit, said gasket having a front flange extending forwardly and terminating adjacent the coupling face of the head, and adapted to abut a similar flexible flange on a mating head, said gasket also having a rear flange adapted to abut against the front end of said conduit, said gasket further having an interior annular recess between its flanges whereby pressure fluid in said recess serves to force said rear flange against said conduit to press the conduit against said locking means and thereby increase the locking effect thereof.

6. In an automatic train pipe connector, the combination of a coupling head having an opening therethrough and provided with a seat adjacent the front end of the opening, an expansible gasket mounted in the front end of said opening and adapted to rest against said seat, said gasket having a flexible flange at the rear end thereof, a conduit mounted in said opening at the rear of said gasket and having a front face against which said flexible flange is adapted to press, means for locking said conduit in said opening, said gasket having an internal recess in front of said flange whereby pressure fluid entering said recess causes said flange to press rearwardly against said conduit and force the latter into tight engagement with said locking means.

In testimony whereof I hereunto affix my signature.

JOSEPH ROBINSON.